US005323306A

United States Patent [19]

Storli et al.

[11] Patent Number: 5,323,306

[45] Date of Patent: Jun. 21, 1994

[54] NAVIGATION SYSTEM FOR CONVERTING BEARING TO WAYPOINT DATA FROM A UNIVERSAL NAVIGATION SYSTEM TO SIGNALS USABLE BY AN OMNI BEARING SELECTOR

[75] Inventors: Tom J. Storli, Valencia; Jeffery G. Hopkins, Castaic, both of Calif.

[73] Assignee: Troll Avionics, Valencia, Calif.

[21] Appl. No.: 840,391

[22] Filed: Feb. 24, 1992

[51] Int. Cl.[5] .......................... G01S 1/08; G06F 15/50

[52] U.S. Cl. .................................... 364/452; 364/448; 342/451; 342/388

[58] Field of Search ............... 364/449, 451, 452, 448; 340/952; 342/401, 404, 388, 451, 357

[56] References Cited

U.S. PATENT DOCUMENTS

| | | | |
|---|---|---|---|
| 4,253,150 | 2/1981 | Scovill | 364/449 |
| 4,604,625 | 8/1986 | Davidson | 343/401 |
| 4,893,127 | 1/1990 | Clark et al. | 342/386 |
| 5,163,004 | 11/1992 | Rentz | 364/460 |

*Primary Examiner*—Thomas G. Black
*Assistant Examiner*—Michael Zanelli
*Attorney, Agent, or Firm*—Herbert M. Shapiro

[57] ABSTRACT

Apparatus is provided in an aircraft to convert signals from a Universal Navigation System such as LORAN to signals compatible with the standard Omni Bearing Selector (OBS) in the aircraft. The apparatus allows a visual bearing to any destination to be provided for the navigator.

5 Claims, 5 Drawing Sheets

NAVIGATION SYSTEM FOR CONVERTING BEARING TO WAYPOINT DATA FROM A UNIVERSAL NAVIGATION SYSTEM TO SIGNALS USABLE BY AN OMNI BEARING SELECTOR

FIELD OF THE INVENTION

This invention relates to aircraft navigation systems and more particularly to equipment for converting standard LORAN waypoint information to a format for a standard VOR converter.

BACKGROUND OF THE INVENTION

As is well known, the standard VOR system for aircraft navigation comprises a source of a ground signal and an omni bearing selector (OBS) in the aircraft. The navigator turns the selector to align with the beam provided by the ground signal and merely follows the beam to the "waypoint". In this manner, the navigator could follow a course to any VOR Station in any direction in 360 degrees. This was an early navigation system for aircraft which permitted the navigator to follow a course to the source of the beam.

The LORAN system is different. The LORAN system, as is the case with other universal navigation systems, permits a navigator to set a course to any desired destination rather than to a VOR Station. The system is a ground or satellite based system. The navigator has equipment which calculates the position of the aircraft from the LORAN signal and determines bearing to waypoint data as is also well understood.

BRIEF DESCRIPTION OF THE INVENTION

In accordance with the principles of the present invention, equipment is provided in the aircraft to take the bearing-to-waypoint data provided by the LORAN (or other universal navigation system) and create a (virtual) VOR signal with which the Omni bearing selector can be used. In this manner, a visual bearing to any destination is provided for the navigator.

DETAILED DESCRIPTION OF AN ILLUSTRATIVE EMBODIMENT OF THIS INVENTION

Figure 1:
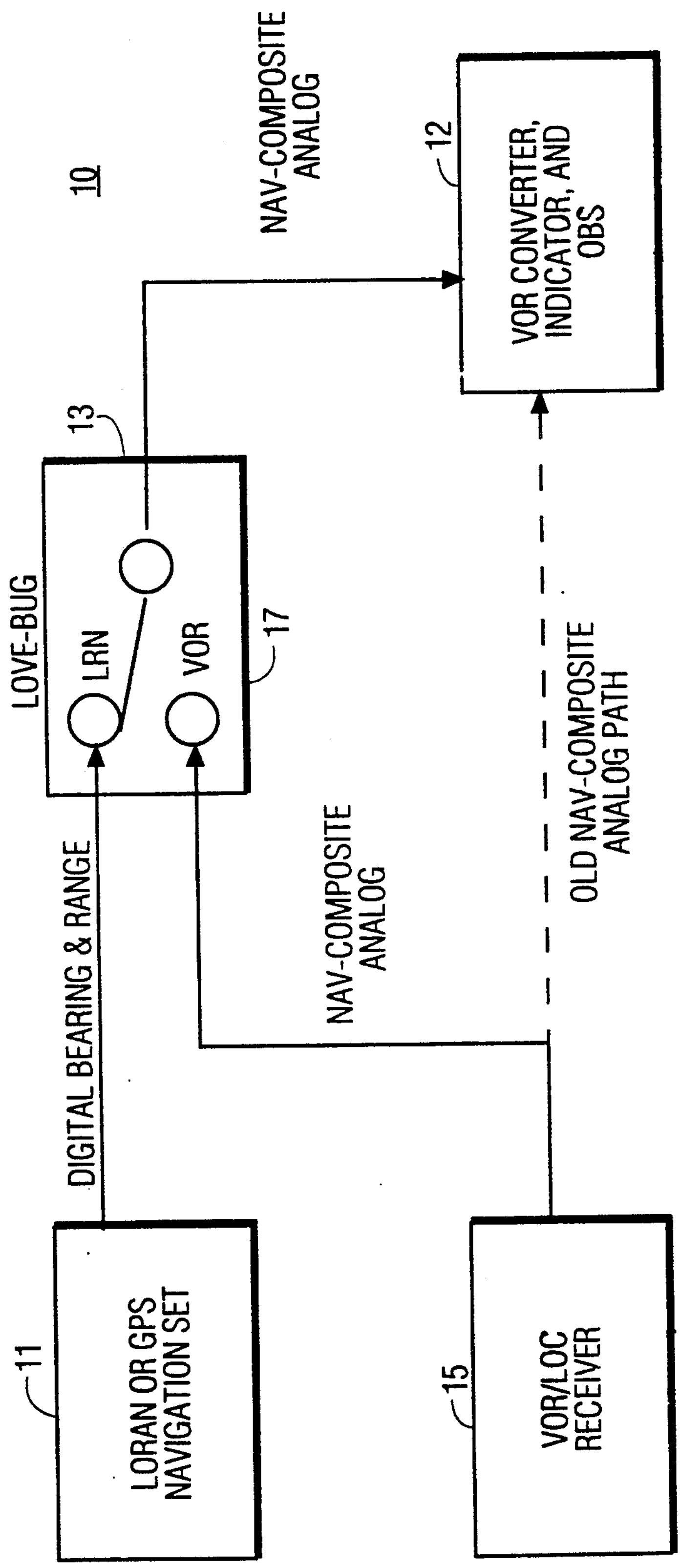
FIG. 1 is a block diagram of a navigation system including a receiver in accordance with the principles of this invention.

FIG. 1 show a block diagram of a system 10 for converting universal navigation signals such as provided by an on-board LORAN or GPS navigation set, as indicated by block 11, to signals usable by the on-board OBS indicator represented by block 12. The system includes a converter for converting the digital bearing and range (DBR) signals from block 11 to the NAV-Composite analog signals required by block 12. The converter is represented by block 13 and is known commercially as the "Love Bug." In practice, the converter is switchable between a VOR/LOC receiver represented by block 15, for standard (VOR) operation or for converting DBR signals to the NAV-composite analog as indicated in FIG. 1 via an external mode control switch 17.

Figure 2:
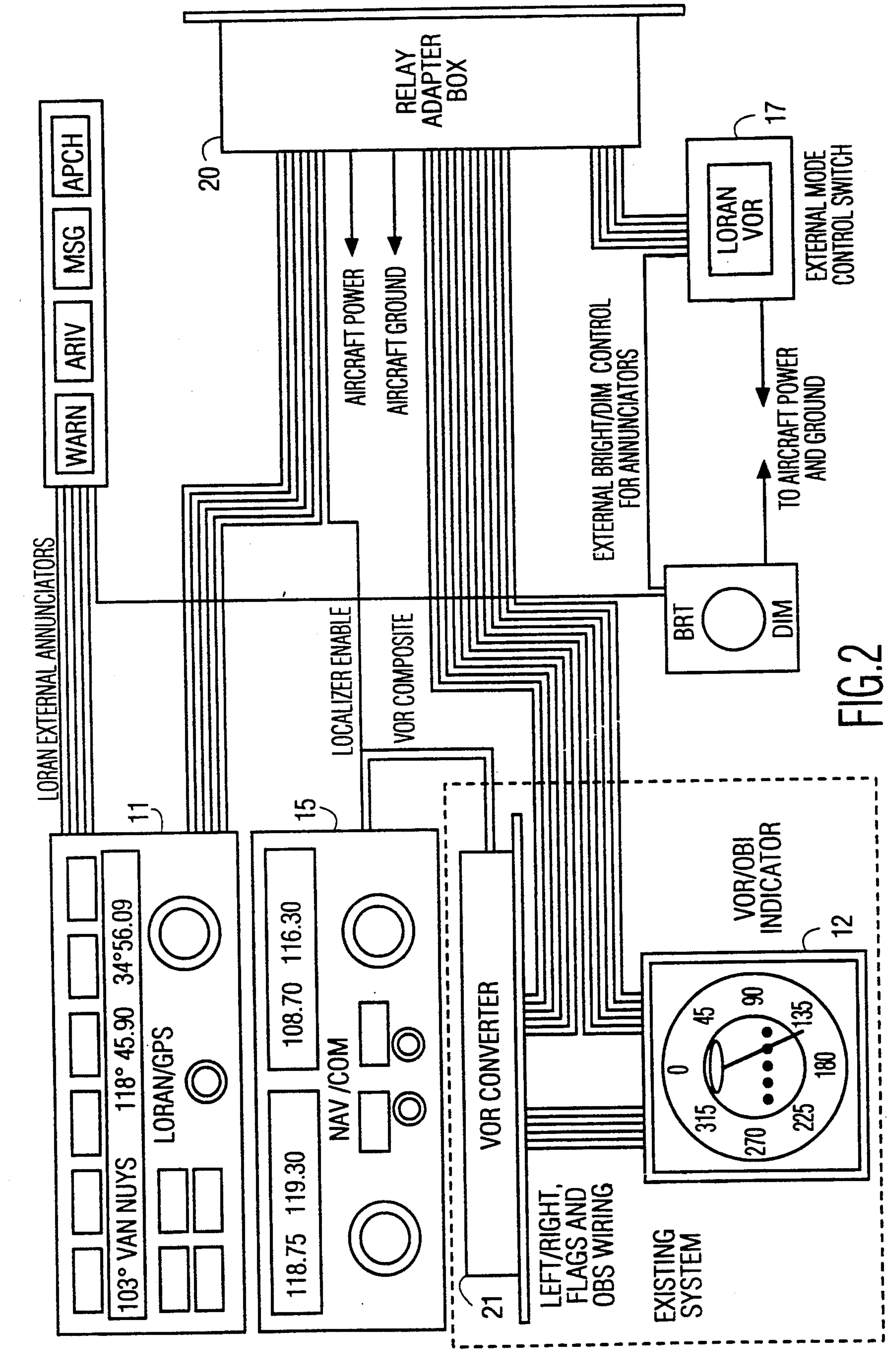
FIG. 2 is a schematic representation of a system wiring diagram for the system of FIG. 1.

FIG. 2 shows a typical system wiring schematic with a relay adapter box 20. Power and ground connections are provided to the various components of the system via box 20 as indicated in the figure. The VOR/OBS indicator 12 is shown in FIG. 2 in its conventional form as are components 11 and 15 corresponding to LORAN/GPS navigation set and the VOR/LOC receiver respectively. The VOR converter 21 along with external mode control switch 17 reside in block 13 of FIG. 1.

Figure 3:
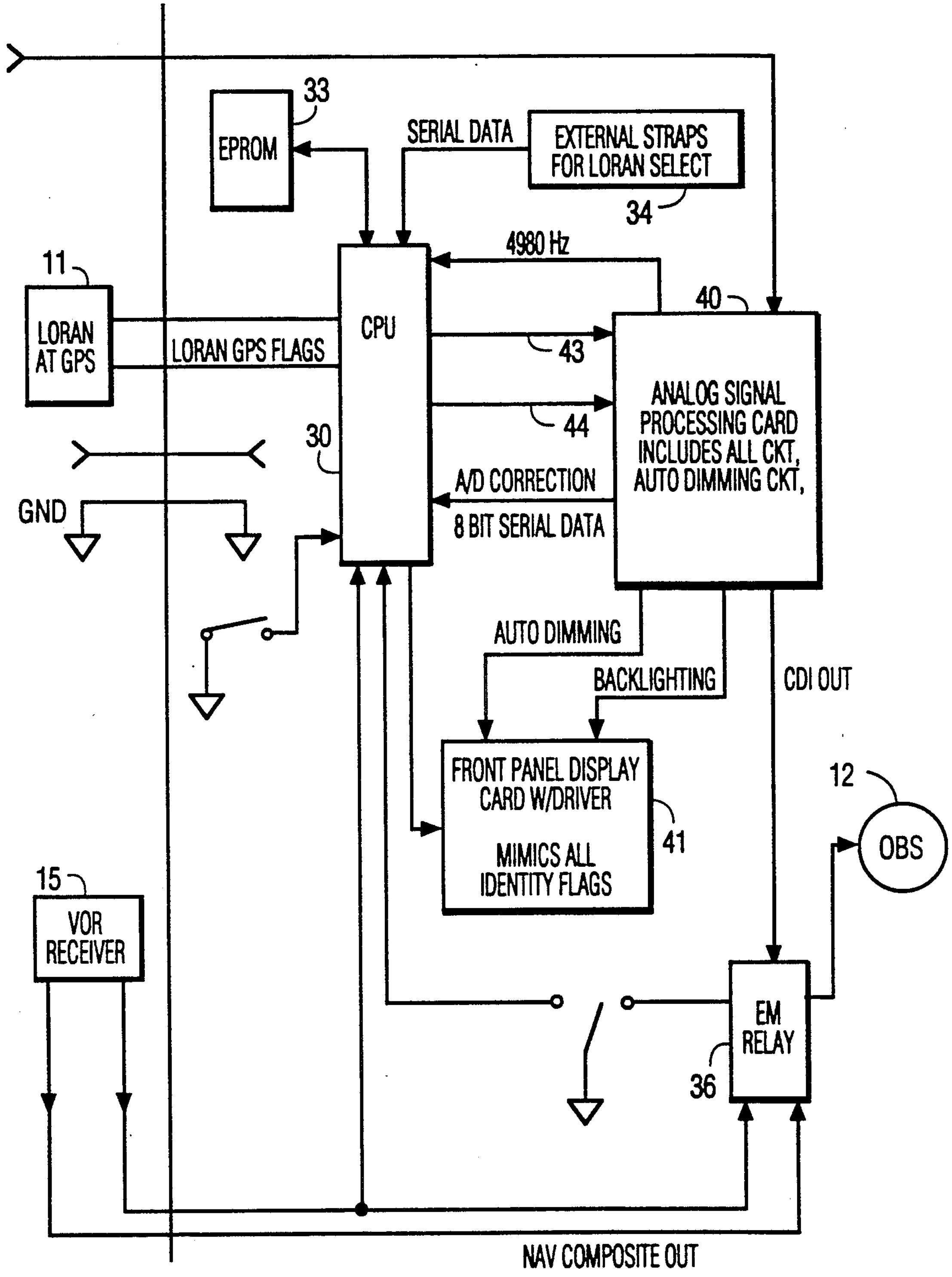
FIG. 3 is a functional block diagram of a receiver for the system of FIG. 1.

The functional block diagram for VOR converter 21 is shown in FIG. 3 and is presently available commercially as the "Love Bug" from the assignee of the present patent application. Specifically, converter 21 includes a central processing unit (CPU) 30 which, in practice, is an INTEL P80C51FA microcontroller. The CPU contains and 8-bit microprocessor core, random access memory (RAM), a programmable serial channel, timers, counters and a high speed output controller. The output controller allows the CPU to output very precisely timed output waveforms, the relationships of which can be shown to be strictly a function of software.

The CPU is connected to a number of system components: LORAN or GPS navigation set 11 (of FIG. 1) has its output connected to inputs to the CPU as shown in the figure. Also, EPROM 33 is connected to the CPU. Outputs of navigation mode (LORAN-SELECT) component 34 also is connected to inputs to the CPU. VOR receiver 15 of FIG. 1 also is connected to the CPU and to EM Relay 36, as shown in FIG. 3. The output of relay 36 is connected to OBS indicator 12.

The system includes an analog signal processing card 40 which includes all auto dimming circuits and front panel display controls. The display and drivers are indicated by block 41. Outputs from CPU 30 are converted to inputs to card 40. An output of card 40 also is connected to EM relay 36.

Once the power up sequence is completed under the control of the CPU, the CPU begins to read serial data from LORAN/GPS receiver 15. In practice, the CPU reads incoming data continuously as it becomes available but takes no action until a "data valid" flag is set as is conventional. The CPU responds to a valid bearing and range from receiver 15 to perform calculations to generate two signals—REF 30 HZ (MREF) and VAR phase 30 Hz (MVAR) on lines 43 and 44 of FIG. 3 respectively—which are routed to the analog card as shown.

The bearing information is derived as follows; The MREF signal is taken as the reference signal and consists of a TTL level pulse train with a period of 33.33 ms (or a frequency = 30 Hz). Then the time delay between low to high or high to low clock transitions for the MREF signal relative to the MVAR signal gives the bearing information by the equation;

if O ≦ time delay < 33.333 ms then (time delay/33.333) times 360 = bearing in degrees.

The analog card responds to the MREF and MVAR signals to perform the necessary frequency modulation and summing operations to generate the composite analog signal out which is compatible with the omni bearing indicator 12 of FIG. 1.

The CPU also determines whether the range information in the serial bit stream is greater than 200 nautical miles. If it is greater, the CPU shuts off the analog out and lights a RANGE annunciator on a front panel (not shown) in the cockpit.

Figure 4:
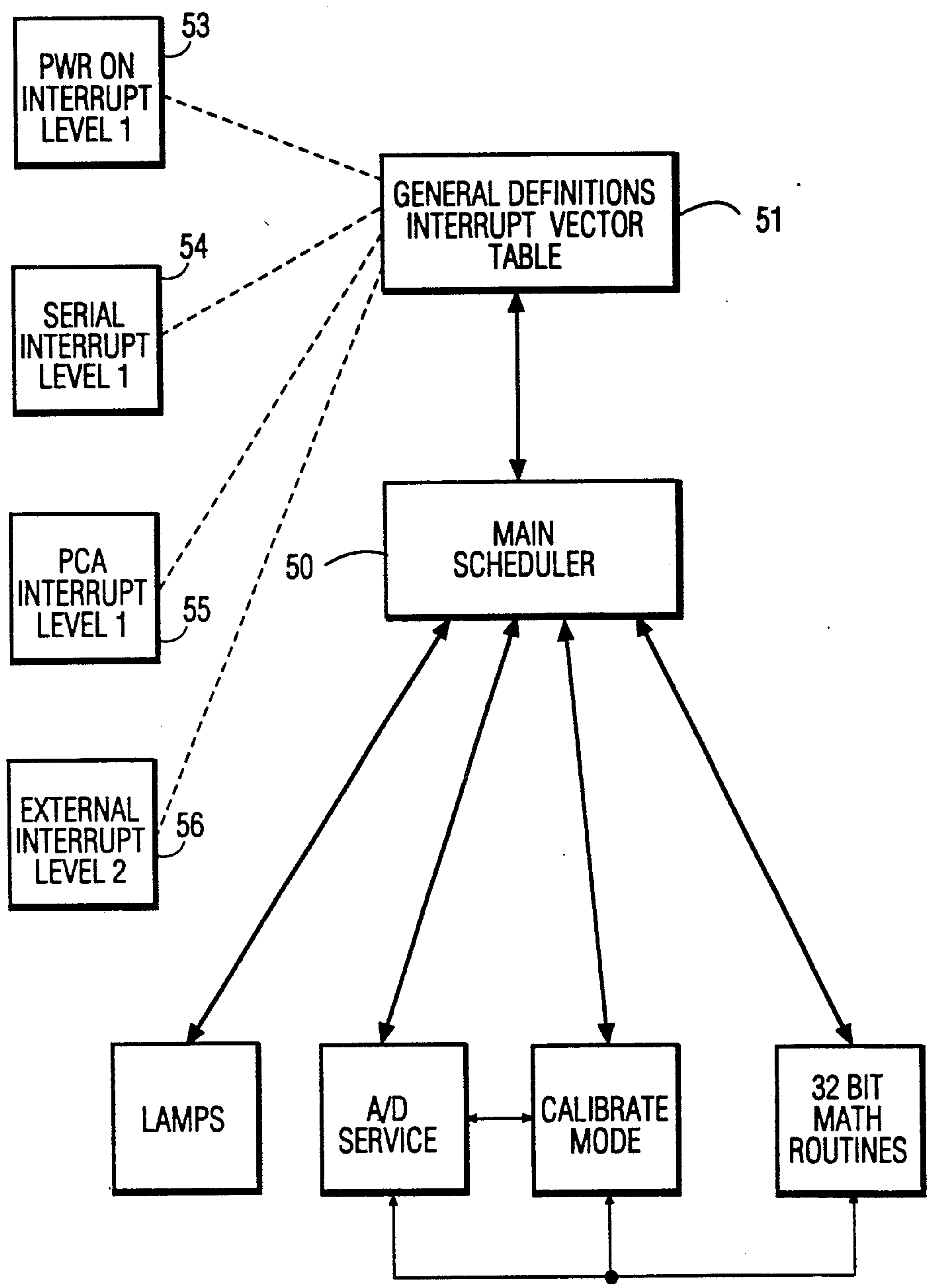
FIG. 4 is a flow diagram for the operation of the receiver of FIG. 1.

The system includes a main scheduler 50 and an interrupt vector table 57 both of which are defined by software in the CPU by conventional means. There are four interrupts in a practical embodiment of the invention; A "power on" interrupt, a serial interrupt, a PCA interrupt, and an external interrupt noted in FIG. 4 as blocks 53, 54, 55, and 56. When all interrupts are enabled, they can interrupt the main scheduler or any subroutine at any time. But no interrupt service routine can be interrupted except by the external interrupt.

The "power up" interrupt (PWRUP) initializes the system when power is turned on or the software is reset. This interrupt also reads the LORAN equipment lines and initializes the CPU serial point for the appropriate LORAN receiver.

The "main scheduler" (MAIN) tests output qualifiers, times the LORAN serial data, computes lag angles and sets east/west flags and services the instrument panel.

The "PCA" interrupt (PCAINT) operates to reload match registers in the CPU for the CDI signals and suppresses CDI output until all qualifiers are valid.

The "SIO" interrupt (SIOINT) services the serial point and selects the appropriate handler for hardware strapped LORAN receiver equipment. This interrupt controls the reading of the LORAN serial data stream and provides range, bearing and data valid flags to the main scheduler. The various interrupts are conventional and are not described further.

Figure 5:
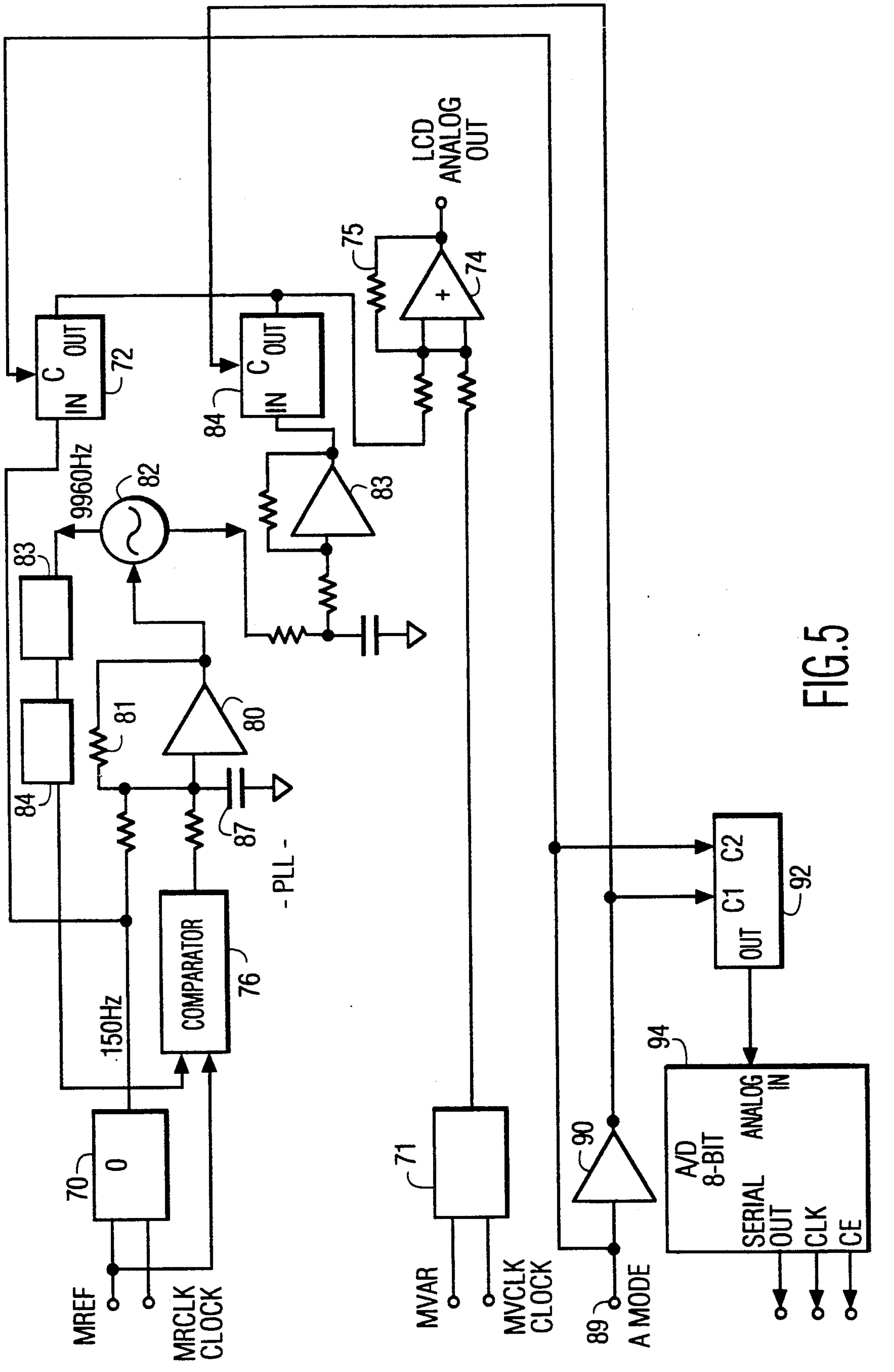
FIG. 5 is a block diagram of a portion of the receiver of FIG. 3.

The operation of the analog card 40 of FIG. 3 is explained in connection with the block diagram of FIG. 5.

Analog card 40 responds to the bearing information, performing frequency modulation and summing operations to generate the composite signal to which Omni Bearing selector 12 responds. Card 40 includes first and second switched-capacitor low pass filters 70 and 71. Signal MREF and a 15,000 Hz. clock pulse are applied to inputs to filter 70. Similarly, signal MVAR and a 9,000 Hz. clock pulse are applied to inputs to filter 71. The output of filter 70 is connected to the input of switch 72. The output of switch 71 is connected to an input to amplifier 74. The output of amplifier 74 is the LCD output analog output as indicated in the figure.

The output of switch 71 also is connected to the input to amplifier 74. A feedback loop 75 also is connected between the output of amplifier 74 and the input thereof. The MREF signal is also applied to an input to phase comparator 76.

The output of filter 70 is connected to the input of amplifier 80 which serves both as an amplifier and a filter in the phase locked loop (PLL) as will become clear. The (voltage error) output of comparator 76 also is connected to the input of amplifier 80. A feedback loop 81 is connected between the output of amplifier 80 and the input thereto. The output of amplifier 80 is connected to the signal source 82 which generates a 9960 Hertz signal at its output. The output of signal source 82 is connected to a divide-by-two circuit 83. The output of circuit 83 is connected to the input of divide-by-166 circuit 84. The output of circuit 84 is connected to an input to comparator 76 for applying a thirty Hertz signal thereto.

The output of signal source 82 also is connected to the input to amplifier 83. The output of amplifier 100 is connected to the input of switch 102. The output of switch 102 and the output of switch 72 are connected to an input of amplifier 74 at the output of which appears the LCD Analog Out signal as indicated in FIG. 5. Feedback loop 87 is connected between the output of amplifier 83 and the input thereto.

The AMODE input 89 is connected to the clock input to switch 72 and, via inverter 90, to the clock input to switch 102. The AMODE input is connected to the C2 input of switch 92 and, via inverter 90, to the C1 input of switch 92. The output of switch 92 is connected to the analog input of Analog to Digital (A/D) converter 94. The A/D converter has a serial out port, a clock output and a (Chip Enable) CE output as shown.

DESCRIPTION OF SIGNAL PROCESSING PERFORMED BY THE ANALOG CARD VOR MODE

1. The 30 Hz. MREF reference signal (square wave) synthesized by the CPU using the system clock (6 MHZ.) serves as the reference frequency for the phase locked loop.

2. The PLL is formed by taking the output of the VCO (voltage controlled oscillator) the center frequency of which is nominally set to 9960 Hz. and dividing it by 332 to get 30 Hz. This 30 Hz. signal is input to the phase comparator along with the 30 Hz. reference signal.

3. The output of the phase comparator is fed into the loop amp/filter combination which produces the error voltage necessary to tune the VCO (at 82) to close the loop.

4. In addition, the 30 Hz. reference, a TTL square wave, is converted to a sine wave by being low pass filtered and summed into the loop amp/filter (80) with the phase detector output. This frequency modulates the now locked 9960 Hz. frequency which provides one of the two components of the VOR composite signal.

5. The frequency modulated 9960 Hz. is input to an active low pass filter to ensure that any distortion which would degrade the final output is removed.

6. Finally, the variable phase 30 Hz. signal, MVAR (at 71), which is synthesized by the CPU based on the bearing information read from the LORAN/GPS, is summed with the frequency modulated (FM'd) 9960 Hz. carrier in the output amplifier. The result is the VOR composite signal.

DESCRIPTION OF THE ANALOG CARD OPERATION IN THE LCD (LINEAR COURSE DEVIATION) MODE

1. LCD can be defined as the absolute distance (in miles) from the desired straight line track to the chosen way point. This is much different from the VOR mode which indicates the relative distance one is from the desired track based on angular displacement.

2. Because the LCD mode displays a linear distance, it can be used for flight lengths of any length while the VOR mode is limited to 200 miles (nautical). The limitation in the VOR mode is because the indicator displays angular displacement and after 200 nm the course width becomes too excessive to be displayed meaningfully.

3. At the same time, the MREF signal is set to 150 Hz. and the MVAR signal is set to 90 Hz. by the CPU. Also, the MRCLK is set to 15,000 Hz. and the MVCLK is set to 9,000 Hz. These two signals serve as the respective clocks for the two switched capacitor low pass filters (70 and 71) that convert the TTL signals, MREF and MVAR from the CPU, to sine waves.

4. The key to the operation of the LCD mode is that the cutoff frequency of the switched capacitor low pass filters is set by the frequency of the clock signal, in this case, the MRCLK and the MVCLK signals. Therefore, the amplitude of the output sine waves, MREF and MVAR can be precisely controlled by varying the clock frequencies, MRCLK and MVCLK. It is exactly this method by which the system in accordance with this invention generates and precisely controls the ratio of the amplitudes of the 150 Hz. signal, MREF, and the 90 Hz. signal, MVAR, so that the resulting output composite waveform is compatible with the OBS in the localizer mode and causes the correct amount of deflection of the needle.

5. Specifically, the CPU reads the CROSS TRACK ERROR from the LORAN/GPS receiver and uses the correct algorithm to compute the exact value of MRCLK versus MVCLK in order to obtain the correct ratio of amplitudes of the MREF and the MVAR signals.

From Trigonometry, tan 3=Cross Track Error (CTD) straight line distance to waypoint. Therefore, in the VOR mode, a 3° deflection would correspond to ≈26 nm and a 5° deflection would correspond to ≈44 nm. However, in the LCD mode, the deflection of the needle can be set up so that full scale deflection corresponds to a Cross Tract Error say of 5 nm even at distances of 500 nm from the waypoint. This can be seen to be useful in the following example; Say a pilot is flying over the ocean to a waypoint that is 500 nm away and he is flying between two restricted airspaces. He is required to fly within 5 nm on either side of his selected track. Therefore, his Cross Track Error must be kept between 5 nm on either side. He can accomplish this by setting the system of FIG. 1 in the LCD mode and by setting the sensitivity (full scale deflection) to plus or minus 5 nm.

OPERATION OF THE ANALOG CARD IN THE LCD MODE

1. For LCD mode, the OBS is placed in the localizer mode so that the needle deflection from center becomes a function of the ratio of a 150 Hz. and a 90 Hz. signal which are summed together. So one specific ratio, i.e. equal amplitudes, results in no deflection whereas another ratio, i.e. 150 Hz. signal is 100 times greater than the 90 Hz. signal, may result in full scale deflection to the right.

2. Once the operator selects the LCD mode, the CPU sets AMODE so that the two (SPST) switches (72 and 102) are set such that the FM'd 9960 Hz. signal is removed and the MREF signal is fed directly into the summing amplifier 74.

3. At the same time, the MREF signal is set to 150 Hz. and the MVAR signal is set to 90 Hz. by the CPU. Also, MRCLK is set to 15,000 Hz. and MVCLK is set to 9,000 Hz. These two signals serve as the respective clocks for the two switched capacitor low pass filters (70 and 71) that convert the TTL signals, MREF and MVAR, from the CPU to sine waves.

What is claimed is:

1. A navigation system, said system including first means for generating signals from $m \geqq 3$ known, spaced-apart positions and second means located in a moving $m+1$th position for calculating the $m+1$th position with respect to said m positions, said second means providing digital signals representative of a user selected bearing to way-point, said system also including third means located at said $m+1$th position responsive to said digital signals for providing a VHF Omni Range (VOR) signal.

2. A system as set forth in claim 1 also including fourth means located at said $m+1$th position, said fourth means including a visual display of bearing to waypoint direction and means for aligning said visual display with said VOR signal.

3. A system as set forth in claim 2 wherein said first means comprises a universal navigation system and said second means includes computer means for triangulating the location of said $m+1$th position.

4. A system as set forth in claim 3 wherein said fourth means comprises an OBS.

5. Apparatus responsive to signals from three or more spaced apart transmitters at known coordinates for triangulating the position of said apparatus and for generating an output signal representative of that position, said apparatus also including means responsive to that output signal for generating a bearing to waypoint signal, said apparatus also including means for generating virtual VOR signals for aligning a visual indicator with said bearing to waypoint signal.

* * * * *